(12) United States Patent
Hönl et al.

(10) Patent No.: US 10,221,797 B2
(45) Date of Patent: Mar. 5, 2019

(54) METHOD AND CONTROL DEVICE FOR MONITORING PRESSURE IN A CRANKCASE

(71) Applicant: MTU Friedrichshafen GmbH, Friedrichshafen (DE)

(72) Inventors: Michael Hönl, Fronreute (DE); Christian Rehm, Friedrichshafen (DE); Kai-Michael Trautz, Augsburg (DE); Johannes Baldauf, Wangen (DE)

(73) Assignee: MTU FRIEDRICHSHAFEN GMBH, Friedrichshafen (DE)

( * ) Notice: Subject to any disclaimer, the term of this patent is extended or adjusted under 35 U.S.C. 154(b) by 53 days.

(21) Appl. No.: 15/106,055

(22) PCT Filed: Nov. 18, 2014

(86) PCT No.: PCT/EP2014/003075
§ 371 (c)(1),
(2) Date: Jun. 17, 2016

(87) PCT Pub. No.: WO2015/090495
PCT Pub. Date: Jun. 25, 2015

(65) Prior Publication Data
US 2016/0319762 A1 Nov. 3, 2016

(30) Foreign Application Priority Data
Dec. 19, 2013 (DE) ........................ 10 2013 021 295

(51) Int. Cl.
*G01M 15/09* (2006.01)
*F02D 41/22* (2006.01)
*F01M 13/00* (2006.01)
*F02D 41/04* (2006.01)
*F02F 7/00* (2006.01)
*G01M 99/00* (2011.01)

(52) U.S. Cl.
CPC ............ *F02D 41/22* (2013.01); *F01M 13/00* (2013.01); *F02D 41/042* (2013.01); *F02F 7/0043* (2013.01); *G01M 99/008* (2013.01); *F01M 2013/0083* (2013.01); *F02D 2041/228* (2013.01)

(58) Field of Classification Search
USPC ........................................................ 73/114.77
See application file for complete search history.

(56) References Cited

U.S. PATENT DOCUMENTS

| 4,763,627 A | 8/1988 | Tomisawa |
| 5,792,949 A | 8/1998 | Hewelt et al. |

(Continued)

FOREIGN PATENT DOCUMENTS

| DE | 10017788 C2 | 11/2000 |
| DE | 102010040900 A1 | 3/2012 |

(Continued)

*Primary Examiner* — Eric S. McCall
(74) *Attorney, Agent, or Firm* — Lucas & Mercanti, LLP; Klaus P. Stoffel

(57) ABSTRACT

A method and a control device for monitoring the pressure in a crankcase of an internal combustion engine. The desired values for the pressure in the crankcase are defined for a plurality of operating points of the internal combustion engine. Furthermore, at least one of the defined desired pressure values is modified during operation of the internal combustion engine.

9 Claims, 4 Drawing Sheets

(56) References Cited

U.S. PATENT DOCUMENTS

| | | | |
|---|---|---|---|
| 6,112,150 | A | 8/2000 | Irons et al. |
| 6,240,772 | B1 * | 6/2001 | Thomas ................ G01M 15/09 73/114.01 |
| 6,561,015 | B1 * | 5/2003 | Pfeiffer ................ G01L 11/002 73/114.57 |
| 8,887,559 | B2 | 11/2014 | Kuhn et al. |
| 9,031,768 | B2 | 5/2015 | Lagerlöf et al. |
| 9,260,990 | B2 | 2/2016 | Rollinger et al. |
| 2004/0267432 | A1 | 12/2004 | Fulton |
| 2010/0050754 | A1 | 3/2010 | Roal et al. |
| 2011/0213538 | A1 * | 9/2011 | Amann ................ F02D 37/02 701/102 |
| 2014/0081564 | A1 | 3/2014 | Pursifull et al. |

FOREIGN PATENT DOCUMENTS

| | | |
|---|---|---|
| DE | 102013218264 A1 | 3/2014 |
| DE | 102013218306 A1 | 5/2014 |
| EP | 0241030 A2 | 10/1987 |
| JP | H0419312 A | 1/1992 |
| JP | 2009085177 A | 4/2009 |
| WO | 2009116897 A1 | 9/2009 |
| WO | 2013039733 A1 | 3/2013 |

\* cited by examiner

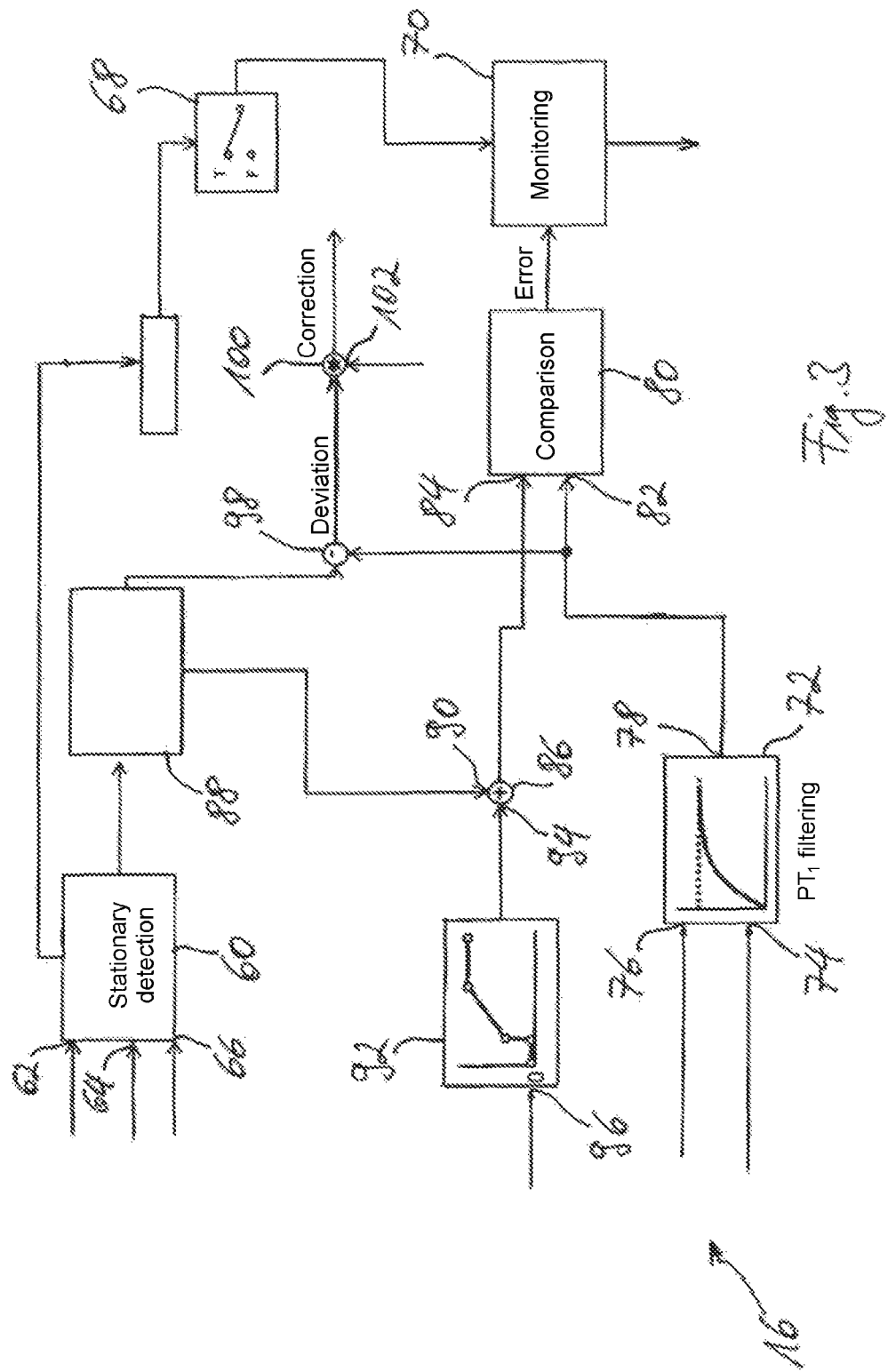

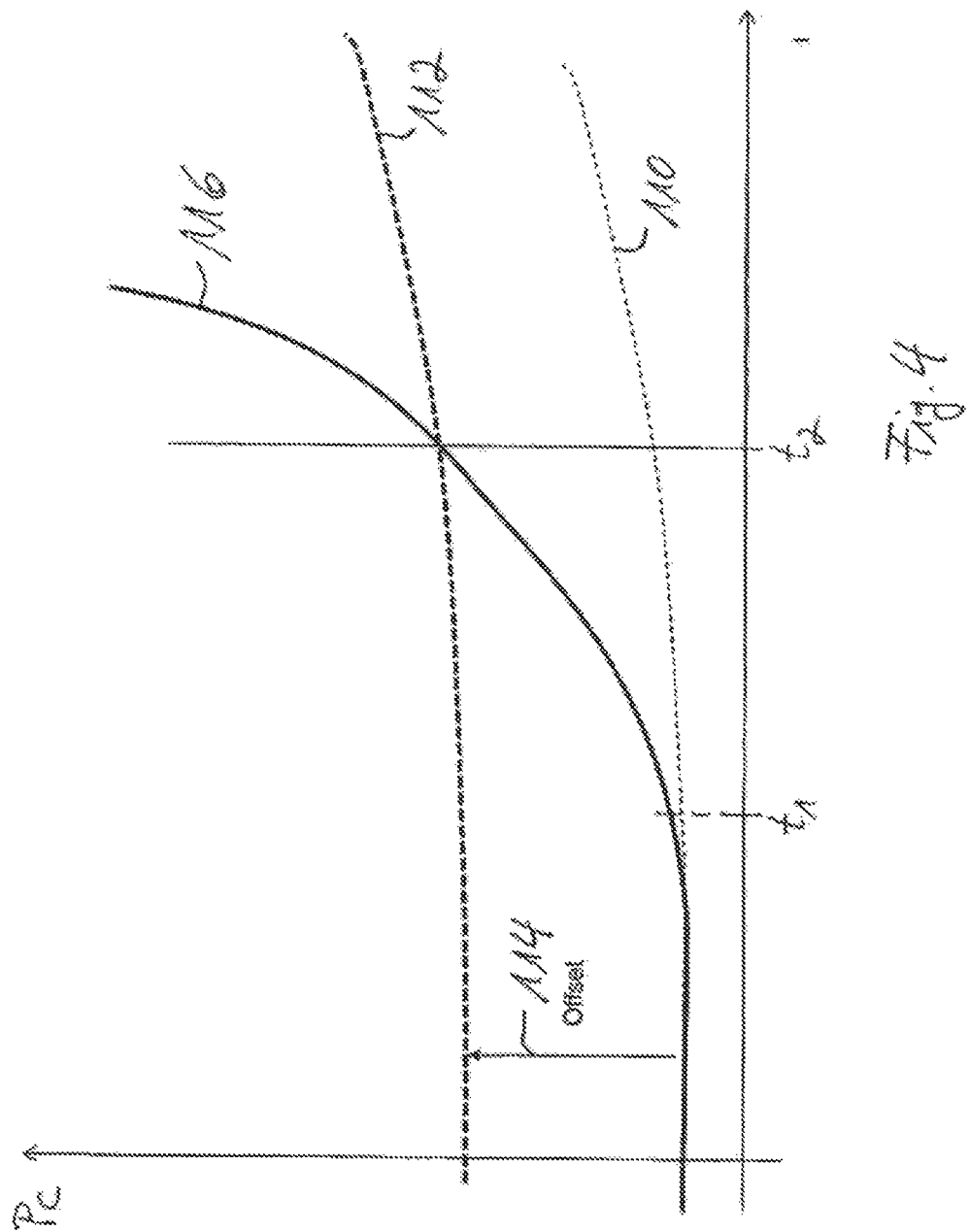

METHOD AND CONTROL DEVICE FOR MONITORING PRESSURE IN A CRANKCASE

The present application is a 371 of International application PCT/EP2014/003075, filed Nov. 18, 2014, which claims priority of DE 10 2013 021 295.2, filed Dec. 19, 2013, the priority of these applications is hereby claimed and these applications are incorporated herein by reference.

BACKGROUND INVENTION

In particular, in the case of a defect, during the operation of an internal combustion engine the pressure in the crankcase can suddenly and quickly rise. This can lead, under certain circumstances, to the destruction of the internal combustion engine. It is therefore generally known to monitor the crankcase pressure of the internal combustion engine. This is usually done by means of a sensor with which the pressure which is currently present in the crankcase is determined. The current crankcase pressure is compared with a predefined threshold value in a control of the internal combustion engine. If the current crankcase pressure exceeds the threshold value, a fault is present and the internal combustion engine is shut down. The threshold value is defined, on the one hand, in such a way that large damage to the internal combustion engine is prevented. On the other hand, it is to be ensured that unnecessary switching off of the internal combustion engine when a low threshold value is detected is avoided. When the internal combustion engine is set, a compromise must therefore be made between these two requirements.

SUMMARY OF THE INVENTION

The object of the present invention is to ensure reliable monitoring of a crankcase pressure in a crankcase of an internal combustion engine and as a result to avoid damage to the internal combustion engine.

In the method according to the invention for monitoring a crankcase pressure in a crankcase of an internal combustion engine, setpoint pressure values for the crankcase pressure are defined for a plurality of operating points of the internal combustion engine. In addition, at least one of the defined setpoint pressure values is changed during the operation of the internal combustion engine. The control device according to the invention for monitoring a crankcase pressure in a crankcase of an internal combustion engine is configured in such a way that it defines setpoint pressure values for the crankcase pressure for a plurality of operating points of the internal combustion engine. Said control device is further configured in such a way that it changes at least one of the defined setpoint pressure values during the operation of the internal combustion engine.

On the basis of the present invention it is advantageously possible to adapt at least one of the setpoint pressure values and as a result improve, in particular regularly, the monitoring of the crankcase pressure. During the running time of the internal combustion engine, the behavior and properties of components of the internal combustion engine change, for example as a result of ageing. For example, wear of piston rings or contamination of filters which are provided behind a crankcase venting means can occur. As a result, the crankcase pressure which occurs under normal conditions in the crankcase can also change. According to the invention, at least one of the setpoint pressure values for the crankcase pressure is therefore changed. As a result, the setpoint pressure value can be particularly advantageously adapted to changed conditions and changed behavior, in particular of the internal combustion engine or its components. On the basis of the invention it is advantageously possible to monitor the pressure in the crankcase for creeping changes, in particular a creeping increase and as a result to react early thereto with suitable measures. A limit or a threshold value for the current crankcase pressure can advantageously be positioned so close to the setpoint pressure value that unnecessary switching off of the internal combustion engine is avoided and at the same time good protection against damage is ensured. The changing of the at least one setpoint pressure value advantageously takes place according to a predefined criterion. The internal combustion engine is particularly advantageously a diesel engine. The inventive monitoring of the crankcase pressure and the changing of the at least one setpoint pressure value preferably take place in an automated fashion, in particular continuously, at predefined times or at predefined time intervals. The term setpoint pressure value means here, in particular, a value for the crankcase pressure which is requested or desired for the respective operating point of the internal combustion engine.

In one advantageous embodiment variant, the changed, at least one defined setpoint pressure value is defined as a new setpoint pressure value for the crankcase pressure for one of the operating points of the internal combustion engine. The changed conditions and the changed behavior of the internal combustion engine are therefore advantageously learnt for the monitoring of the crankcase pressure.

In a further advantageous refinement of the invention, the at least one defined setpoint pressure value is changed as a function of pressure information about a currently present crankcase pressure. In this way, the changing of the at least one setpoint pressure value can be particularly well adapted to the changed behavior of the internal combustion engine. The selection of the at least one setpoint pressure value from the plurality of setpoint pressure values is carried out, in particular, as a function of that operating point at which the internal combustion engine is when the pressure information is determined. The pressure information is particularly advantageously contained in a signal. In such a form, the pressure information can be particularly easily processed and evaluated.

In a further advantageous refinement, the pressure information is filtered by means of a filter, and the at least one of the defined setpoint pressure values is changed as a function of the filtered pressure information. In this way, the pressure information can be suitably conditioned for further processing and evaluation. Even more precise monitoring of the crankcase pressure can be carried out by means of the filtered pressure information.

In one particularly preferred refinement of the invention, the filter with which the pressure information is filtered brings about averaging over time which is characterized by a filter time constant as a filter parameter. By means of such a filter it is advantageously possible to carry out averaging or damping of the pressure information, in particular during a transient recovery process. As a result, particularly precise monitoring of the crankcase pressure can be advantageously ensured. The filter can be, in particular, a filter with a low-pass characteristic. For example, the filter has what is referred to as $PT_1$ element. The filter time constant is particularly advantageously between 0.5 minutes and 5 minutes, in particular is 1 minute.

According to one development of the invention, the at least one of the setpoint pressure values is changed as a function of detection of steady-state operation of the internal combustion engine, during which the internal combustion engine is operated within the limits of an operating range of the internal combustion engine over at least one predefined time period. As result, it is advantageously possible to ensure that fluctuations in the crankcase pressure owing to customary small changes in the operating point of the internal combustion engine are not taken into account. When the steady-state operation of the internal combustion engine is detected, it is determined, for the sake of simplicity, the time period for which the internal combustion engine operates in a rotational speed range and/or torque range. The rotational speed range and/or torque range are/is advantageously a range of a specific characteristic curve diagram of the internal combustion engine. When the internal combustion engine enters the rotational speed range and/or torque range, for the sake of simplicity, measurement of the time is started. If the internal combustion engine remains in this rotational speed range and/or torque range at least for the predefined time period, the steady-state operation is detected. The inventive monitoring of the crankcase pressure can then advantageously be carried out. The predefined time period can advantageously be set and changed. It is particularly advantageously between 3 minutes and 10 minutes, in particular is 5 minutes.

Particularly advantageously, there is a hysteresis range for detecting the steady-state operation of the internal combustion engine. As a result, undesired jumping to and fro between adjacent operating ranges of the internal combustion engine can advantageously be avoided. The limit of the operating range is, in particular, an upper limit of the operating range. The hysteresis range is, in particular, a partial range of a characteristic curve diagram of the internal combustion engine, which partial range is adjacent to a first range of the characteristic curve diagram in a second range of the characteristic curve diagram which is adjacent to the first range. If, for example, the internal combustion engine leaves the first range during its operation and enters the hysteresis range, new timing for detecting the steady-state operation is not started until the internal combustion engine leaves the hysteresis range in the direction of the second range. In the case of renewed jumping into the hysteresis range, the detection of the steady-state operation is, however, not started again until the hysteresis range has exited in the region of the first range.

The filter time constant is preferably shorter than the predefined time period for detecting the steady-state operation of the internal combustion engine. As a result it can be advantageously ensured that during the determination of the filtered pressure information a steady state of the filtered pressure information is already present before the steady-state operation of the internal combustion engine is detected and the monitoring of the crankcase pressure is started.

A fault is particularly preferably detected during the operation of the internal combustion engine as a function of pressure information about a current crankcase pressure and the sum of a predefined offset value and the setpoint pressure value for the crankcase pressure, which value is assigned to the predefined operating point of an operating range in which the internal combustion engine is operated. As a result, the presence of a fault can be reliably detected and suitable measures taken. The predefined operating point of the operating range is advantageously a center point of the operating range, in particular in a characteristic curve diagram of the internal combustion engine. It is particularly advantageously possible to use two different offset values. For example, when a first offset value is used, the detected fault is indicated, in particular visually or acoustically. When a second offset value is used which is higher than the first offset value, the internal combustion engine which is operating is shut off in order to avoid relatively serious damage. The filtered pressure information is particularly advantageously used to detect the fault during the operation of the internal combustion engine. As a result, the fault can be detected with even greater reliability.

According to one embodiment of the invention, a deviation of the at least one of the detected setpoint pressure values from pressure information about the current crankcase pressure is determined. In addition, the at least one of the detected setpoint pressure values is changed as a function of multiplication of this deviation by a factor, wherein the factor is less than one and greater than zero. As a result, the at least one of the detected setpoint pressure values can advantageously be adapted particularly easily and reliably. With the factor it is possible to set particularly simply how quickly the change in the at least one of the detected setpoint pressure values or the adaptation to a change in the currently detected crankcase pressure is to take place. The factor can be particularly advantageously set and changed. The filtered pressure information is advantageously used to determine the deviation. By virtue of particularly suitable definition of the factor it is possible to avoid a situation in which a faulty, rapidly changing crankcase pressure contributes to a considerable degree to the changing of the at least one setpoint pressure value. Rapid and pronounced changes in the crankcase pressure are therefore advantageously taken into account only in a very limited fashion in the changing of the at least one setpoint pressure value. However, slow change, in particular ageing, of the internal combustion engine can certainly and reliably be detected and taken into account. The factor is particularly advantageously between 0.05% and 0.5%, in particularly is 0.2%.

In one advantageous refinement of the invention the changed, at least one defined setpoint pressure value is defined as a new setpoint pressure value for the crankcase pressure for one of the operating points of the internal combustion engine. As a result, particularly precise monitoring of crankcase pressure can be ensured by means of, in particular, continuous learning of new setpoint pressure values for the respective operating point.

Further advantageous embodiments and advantages of the present invention emerge from the following description of exemplary embodiments, wherein reference is made to the appended drawings, in which:

BRIEF DESCRIPTION OF THE DRAWING

FIG. 3 shows a schematic illustration of a block diagram of an exemplary embodiment of the control device according to the invention, and FIG. 4 shows a schematic illustration of an example of a profile of the change in the setpoint value plotted over time and a current crankcase pressure for an operating point of a range of the characteristic curve diagram according to FIG. 2.

DETAILED DESCRIPTION OF THE INVENTION

In the text which follows, unless specified otherwise, the same reference symbols are used for identical or identically acting elements.

Figure 1:
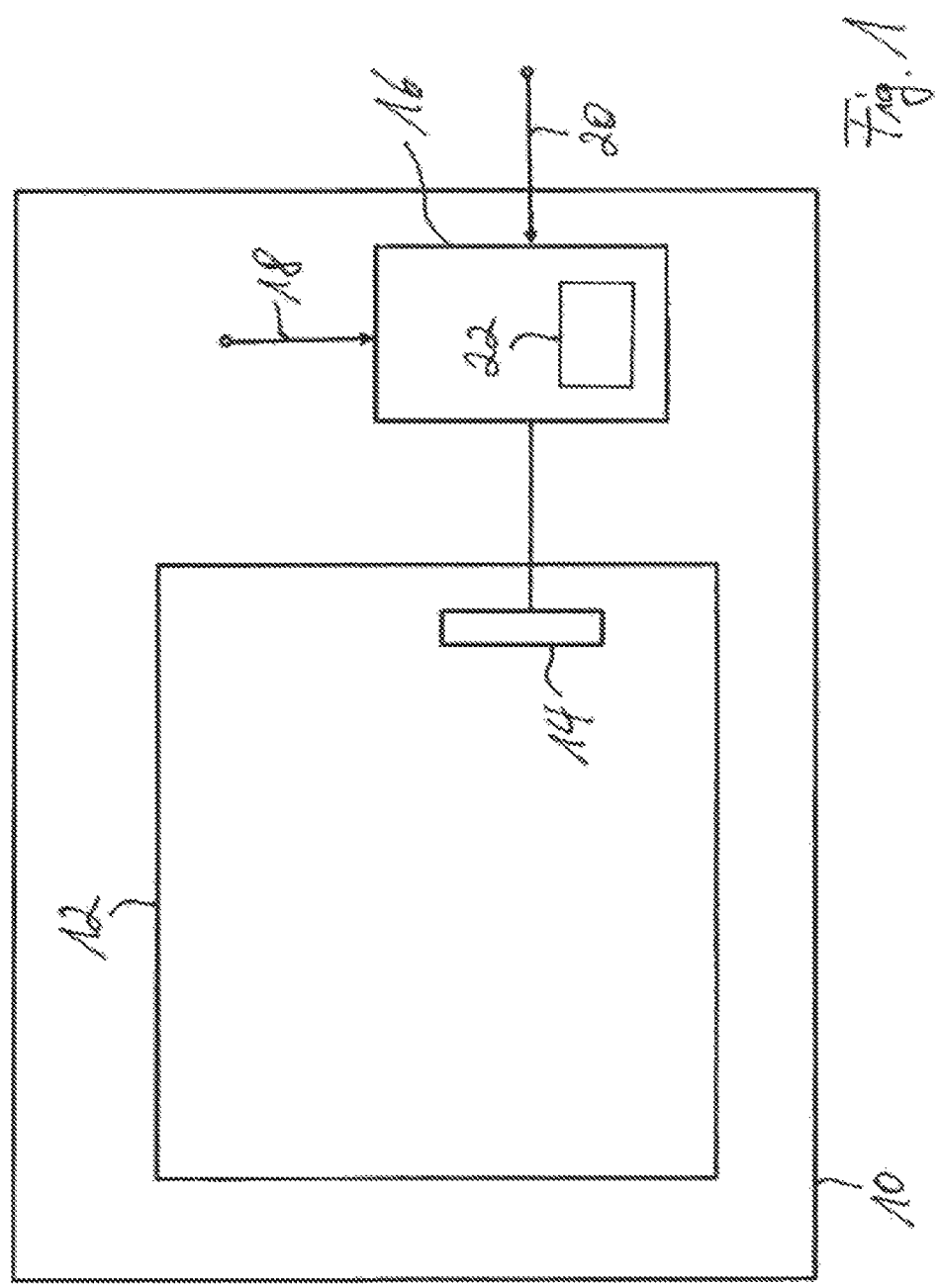
FIG. 1 shows a schematic illustration of an example of an internal combustion engine with a control device according to the invention.

FIG. 1 shows an internal combustion engine which is a diesel engine 10 in the present exemplary embodiment. The diesel engine 10 has a crankcase 12 in which a sensor 14 for measuring a crankcase pressure is arranged in the crankcase 12. The sensor 14 is connected via a cable to a control device 16 according to the invention. The control device 16 controls the diesel engine 10. For this purpose, it receives a multiplicity of input signals from the various components of the diesel engine 10, for example from various sensors, and outputs a multiplicity of output signals, for example to various actuators of the diesel engine 10. In FIG. 1, an internal input signal 18 is illustrated by way of example for the multiplicity of input signals which originate from components of the diesel engine 10 itself. The control device 16 also receives a multiplicity of input signals from outside the diesel engine 10. An external input signal 20 is illustrated by way of example for this multiplicity of external signals in FIG. 1. The control device 16 also has a memory 22 in which a characteristic curve diagram of the diesel engine 10 is stored.

Figure 2:
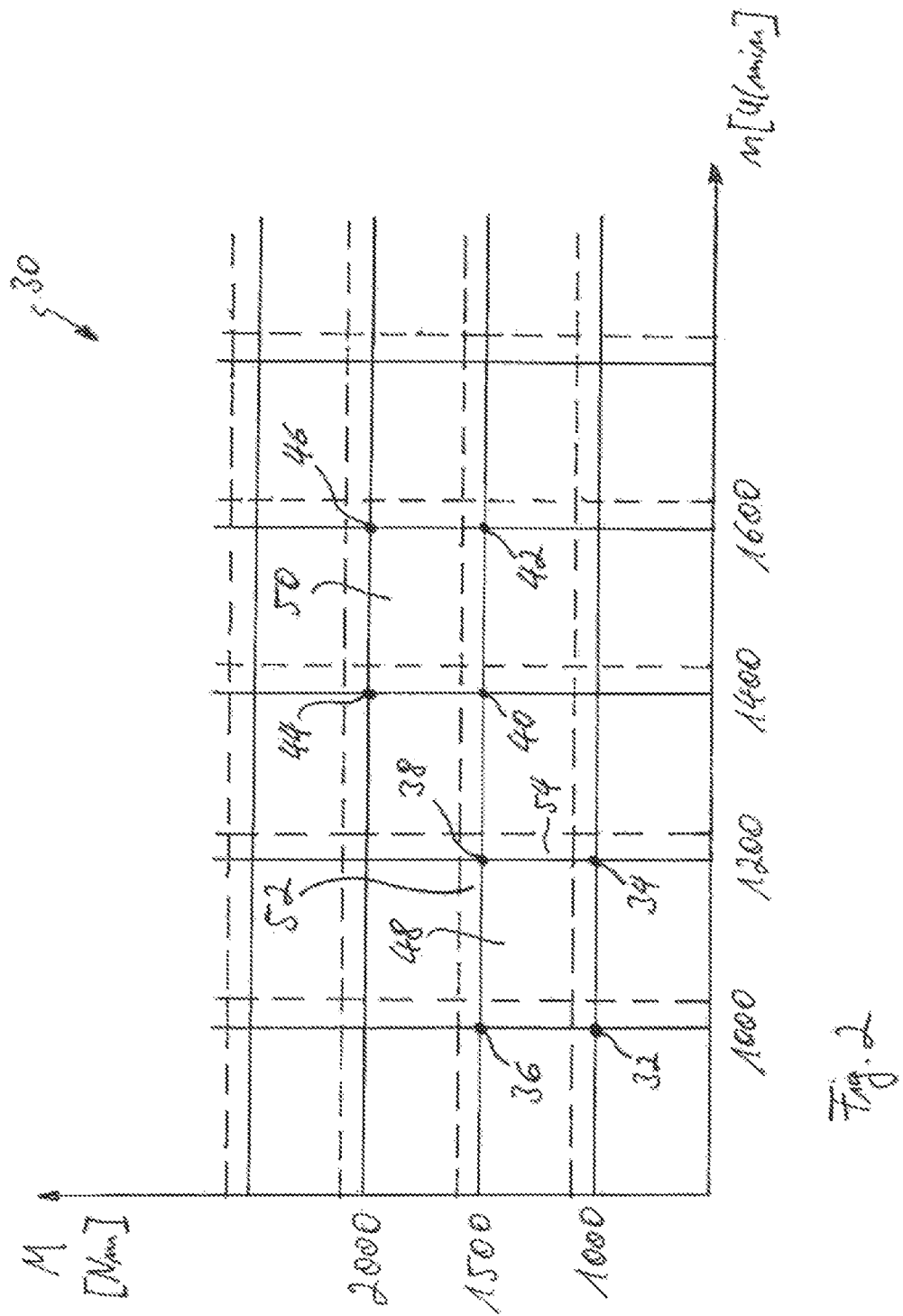
FIG. 2 shows a schematic illustration of an example of a characteristic curve diagram of the internal combustion engine.

FIG. 2 shows a schematic illustration of an example of a characteristic curve diagram 30 of the diesel engine 10. A torque M which is generated by the diesel engine 10 is plotted in the characteristic curve diagram 30 against a rotational speed n of the diesel engine 10. In the characteristic curve diagram 30, a plurality of reference points, which represent certain operating points of the diesel engine 10, are shown. The reference points are located at the points of intersection of the continuous horizontal and vertical lines, which are entered in the characteristic curve diagram 30 in FIG. 2. The horizontal lines characterize torques, and the vertical lines characterize rotational speeds, of the diesel engine 10. Reference points 32, 34, 36, 38 and 40, 42, 44 and 46 are illustrated by way of example for the multiplicity of reference points and are provided with reference symbols. The reference point 32 is located at an operating point at which the diesel engine 10 provides a torque of 1000 Nm at a rotational speed of 1000 rpm. The reference point 34 is located at a torque of 1000 Nm and a rotational speed of 1200 rpm, the reference point 36 at 1500 Nm and 1000 rpm, and the reference point 38 at 1500 Nm and 1200 rpm. The reference point 40 is at 1500 Nm and 1400 rpm, the reference point 42 at 1500 Nm and 1600 rpm, the reference point 44 at 2000 Nm and 1400 rpm, and the reference point 46 at 2000 Nm and 1600 rpm. The characteristic curve diagram 30 has a multiplicity of characteristic curve ranges whose boundaries are defined by the operating points which are determined as reference points. The characteristic curve ranges correspond ultimately to operating ranges in which the diesel engine 10 can be operated. In the present exemplary embodiment, the characteristic curve diagram 30 contains rectangular characteristic curve ranges whose vertices are the reference points. By way of example for the various characteristic curve ranges of the characteristic curve field 30, a characteristic curve range 48 and a characteristic curve range 50 are illustrated in FIG. 2. The boundaries of the characteristic curve range 48 are determined by the reference points 32-38, and the boundaries of the characteristic curve 50 by the reference points 40-46.

The characteristic curve diagram 30 contains setpoint pressure values for the crankcase pressure for the various reference points which correspond to operating points of the diesel engine 10. In the present exemplary embodiment according to FIG. 2, the reference point 32 is assigned a setpoint pressure point p1 of, for example, 10 mbar, the reference point 34 is assigned a setpoint pressure value p2 of, for example, 11 mbar, the reference point 36 is assigned a setpoint pressure p3 of, for example, 10 mbar, and the reference point 38 is assigned a setpoint pressure value p4 of, for example, 12 mbar. These setpoint pressure values are determined for initial definition using, for example, experimental operation of the diesel engine 10 at the various operating points on a test bench. During the operation of the diesel engine 10, the setpoint pressure values can be changed and adapted according to the invention. Changed setpoint pressure values are subsequently assigned as setpoint pressure values to the associated operating point, i.e. the associated reference point, of the characteristic curve diagram 30. The changed setpoint pressure value therefore replaces the corresponding previously defined setpoint pressure value of the characteristic curve diagram 30. In this way, the characteristic curve diagram, and therefore the control device 16, learns setpoint pressure values which are changed continuously or regularly. The learning is advantageously carried out according to a predefined criterion. In the present exemplary embodiment, the learning takes place as a function of a current crankcase pressure in the crankcase 12, determined by means of the sensor 14.

The individual characteristic curve ranges of the characteristic curve diagram 30 also contain hysteresis ranges adjacently to its upper torque limit and rotational speed limits, said hysteresis ranges being illustrated by dashed lines. Such a hysteresis range which is assigned to one of the characteristic curve ranges is therefore located between an upper limit of the characteristic curve range, which limit is represented by an unbroken line, and the next dashed line considered in the direction of increasing torque values or rotational speed values. FIG. 2 illustrates, by way of example for the multiplicity of hysteresis ranges, a hysteresis range 52 which is assigned to the characteristic curve range 48 and adjoins the upper torque limit thereof. In addition, a hysteresis range 54 is illustrated by way of example in FIG. 2, said hysteresis range 54 also being assigned to the characteristic curve range 48 and adjoining the upper rotational speed limit thereof. The same applies to the characteristic curve range 50 and to the other characteristic curve ranges of the characteristic curve diagram 30.

FIG. 3 shows a schematic illustration of a block diagram of an exemplary embodiment of the control device 16 according to the invention for monitoring the crankcase pressure. The control device 16 contains a function block steady-state detection means 60 for detecting steady-state operation of the diesel engine 10. In the present exemplary embodiment, the steady-state operation means that the diesel engine 10 operates at the limits of an operating range of a diesel engine 10 for longer than a predefined minimum time period. The minimum time period is 5 minutes in the present exemplary embodiment. This means that the steady-state operation of the diesel engine 10 is detected if said diesel engine 10 is operated in one of its operating ranges for 5 minutes or longer. The term operating range advantageously relates to one of the characteristic curve ranges including the hysteresis ranges assigned thereto of the characteristic curve diagram 30. In order to determine the operating range, information about the torque M currently supplied by the diesel engine 10 is transmitted to the function block 60 at an input interface 62, and information about the current rotational speed n of the diesel engine 10 is transmitted to the function block 60 at a further input interface 64. By means of these two pieces of information, the current operating point and therefore the current operating range at which the operating point is located are defined in the characteristic curve diagram 30. When the diesel engine 10 enters the operating range, detection of the time is started in the function block 60. This time is monitored and runs on for as long as the diesel engine 10 is operated in the operating range. If it is detected that the measured time exceeds the predefined minimum time period, the steady-state operation of the diesel engine 10 is detected. If the diesel engine 10 exits the operating range during operation before the minimum time period is reached, steady-state operation is not detected. The measuring of the time for detecting the steady-state operation is started again for that operating range in which the diesel engine 10 has then entered and in which it is now operating.

In the text which follows, an example of the specific method of functioning of the function block 60 is described. The diesel engine 10 enters a new operating range and the measuring of the time during which it is operated in this new operating range is started. The function block 60 is transmitted to a current torque of 1300 Nm at a current rotational speed of 1050 rpm. The operating range at which the diesel engine 10 is currently operated is therefore in the characteristic curve range 48 of the characteristic curve diagram 30 according to FIG. 2. The characteristic curve range 48 forms, together with the hysteresis ranges 52 and 54, that operating range in which the diesel engine 10 is currently operated. The operating points in which the diesel engine 10 is operated change during the further operation. However, these operating points first continue to be in the characteristic curve range 48. After five minutes in the characteristic curve range 48, the steady-state operation of the diesel engine 10 is detected. This causes the monitoring of the crankcase pressure to be started. During the further operation of the diesel engine 10, the latter, at its upper rotational speed limit, exits the characteristic curve range 48 and then enters the hysteresis range 54. This entry into the hysteresis range 54 is, however, not evaluated by the function block 60 as exiting of the operating range. The diesel engine 10 does not leave the current operating range until it also leaves the hysteresis range 54 given a further increase in its rotational speed. In this case, it is detected by the function block 60 that there is no longer any steady-state operation of the diesel engine 10. It follows from this that the inventive monitoring of the crankcase pressure is ended. At the same time, renewed measuring of the time is started for renewed detection of the steady-state operation of the diesel engine 10. If the rotational speed of the diesel engine 10 decreases again during the further operation, with the result that the current operating point returns to the hysteresis range 54, the function block 60 then does not evaluate this as renewed exiting of the current operating range. The measuring of the time for the detection of the steady-state operation is therefore continued. If the current operating point of the diesel engine 10 returns again to the characteristic curve range 48 during the further operation when the rotational speed is decreasing, the function block 60 evaluates this as exiting of the current operating range and starts the measurement of the time again. As a result, it is advantageously possible to avoid a situation in which slight jumping to and fro of the operation of the diesel engine 10 between two adjacent characteristic curve ranges when the boundary between the two characteristic curve ranges is passed leads each time to renewed starting of the detection of the steady-state operation.

In the present exemplary embodiment, information about the hysteresis ranges, in particular about their size, is transmitted to a further input interface 66 of the function block 60. It is therefore advantageously possible to adapt the hysteresis ranges, in particular their size, to a specific application or request.

If it is detected by means of the function block 60 that a steady-state operation of the diesel engine 10 is present, the monitoring of the crankcase pressure is activated by means of a switch block 68 to which a signal with information about the detected steady-state operation is fed from the function block 60. The switch block 68 is for this purpose connected to an output interface 70. The output interface 70 can be activated and deactivated by the switch block 68 as a function of the input signal.

In order to monitor the crankcase pressure, the control device has a filter block 72. The filter block 72 contains what is referred to as a $PT_1$ element with a low-pass characteristic. Information with a time constant of the $PT_1$ element can be fed to the filter block 72 at an input interface 74. The characteristic of the $PT_1$ element can be set in this way. The time constant is shorter than the predefined minimum time period for the detection of the steady-state operation of the diesel engine 10. Information about current crankcase pressure determined by the sensor 14 is fed to the filter block 72 at a further input interface 76. This information about the current crankcase pressure is filtered by means of the filter block 72, with the result that information about a filtered crankcase pressure is present at an output 78 of the filter block 72.

This information about the filtered crankcase pressure is fed to a comparator 80. An input 82 of the comparator 80 is for this purpose connected to the output 78. A further input 84 of the comparator 80 is connected to an adder element 86. The adder element 86 feeds information about a comparison pressure to the comparator 80, which comparison pressure is compared with the filtered crankcase pressure by the comparator 80. If the filtered crankcase pressure is higher than the comparison pressure, an increased crankcase pressure and therefore a fault are present. This fault is fed to the output interface 70, which is connected for this purpose to an output of the comparator 80. In the activated state, a signal relating to the visual and/or acoustic indication of the fault or a signal relating to the shutting down of the diesel engine 10 is output by the output interface 70 in the case of a faulty crankcase pressure. The type of the signal which is output by the output interface can advantageously be dependent on the size of the fault which has occurred.

The adder element 86 generates the information about the comparison pressure by adding an offset value and a setpoint pressure value. The setpoint pressure value is fed to the adder element 86 by a memory 88 which is for this purpose connected to an input 90 of the adder element 86. The characteristic curve diagram 30 is stored with the setpoint pressure values, assigned to the various reference points, in the memory 88. The setpoint pressure value which is fed to the adder element 86 depends on the characteristic curve range in which the operating point at which the diesel engine 10 is currently being operated is located. This operating point is known to the function block 60, with the result that suitable information on the determination of the characteristic curve range assigned to the operating point can be transmitted from the function block 60 to the memory 88. The function block 60 is for this purpose connected to the memory 88. The setpoint pressure value which is fed to the adder element 86 depends on the characteristic curve range at which the operating point, at which the diesel engine 10 is currently being operated, is located. In the present exemplary embodiment, a setpoint pressure value which is assigned to the spatial center of the characteristic curve range, in which the operating point is located, is selected as a setpoint pressure value. This setpoint pressure value is determined from those setpoint pressure values which are assigned to the reference points of the characteristic curve range.

The offset value is fed to the adder element 86 by an offset block 92 which is for this purpose connected to an input 94 of the adder element 86. In the present exemplary embodiment, the level of the offset value is dependent on the characteristic curve range in which the operating point, at which the diesel engine 10 is currently being operated, is located. For this purpose, information about the characteristic curve range is transmitted to the offset block 92 at an input 96. In dependence thereon, the offset block 92 determines the offset value which is transmitted to the adder element 86. The offset value can be set and changed and can therefore be adapted to specific applications and requirements.

According to the invention, the setpoint pressure values which are assigned to the reference points of the characteristic curve diagram 30 can be changed. This is done when the steady-state operation of the diesel engine 10 has been detected. This change takes place as a function of the filtered crankcase pressure, which is output at the output 78 of the filter block 72. The filtered crankcase pressure is transmitted to a subtractor element 98. For this purpose, the filter block 72 is connected to the subtractor element 98. In addition, a further pressure setpoint value is fed to the subtractor element 98, said setpoint pressure being obtained from the characteristic curve diagram 30. The memory 88 is connected to the subtractor element 98 for the transmission of this further setpoint pressure value. The further setpoint pressure value is determined as a function of various operating points of the characteristic curve range of the characteristic curve diagram 30 in which the diesel engine 10 is operated since the last start of the time measurement for the detection of the steady-state operation. The torque and rotational speed of these various operating points are averaged, and that operating point of the characteristic curve range to which the further setpoint pressure value is assigned is determined from the averaged torque which is determined in this way and the average rotational speed. The further setpoint pressure value is determined as a function of the setpoint pressure values which are assigned to the reference points of the characteristic curve range.

A deviation of the filtered crankcase pressure from the further setpoint pressure value is determined by means of the subtractor element 98. This deviation is modified by means of a multiplier 100 by a factor which is fed to the multiplier 100 at an input 102. In the present exemplary embodiment, the factor is less than one and greater than zero. The correction value with which one or more of the setpoint pressure values of the characteristic curve diagram 30 can be corrected is present at the output of the multiplier 100. In the present exemplary embodiment, the setpoint pressure values which are assigned to the reference points of the characteristic curve diagram in which the current operating point of the diesel engine 10 is located are corrected. The correction of these setpoint pressure values depends on the distance of the respective reference point from the operating point. The greater the rate of the distance, the smaller the correction, and the smaller the distance the greater the correction. The corrected setpoint pressure values are stored in the memory 88 and replace the corresponding setpoint pressure values of the reference points of the characteristic curve range.

FIG. 4 shows a schematic illustration of an example of a time profile of a change in a setpoint pressure value and a current crankcase pressure for an operating point of a range of the characteristic curve diagram according to FIG. 2. A crankcase pressure $p_c$ is plotted against the time t. The diagram illustrates a curve 110 which represents the time profile of a change in the setpoint pressure value. In addition, a curve 112 which represents a time profile of a change in the comparison pressure is illustrated. The comparison pressure results from the addition of the setpoint pressure value with an offset value 114. In addition, a curve 116 with a time profile of the current crankcase pressure is illustrated. The time profile of the current crankcase pressure runs quickly and steeply starting approximately from a time $t_1$, with the result that a fault situation has to be assumed. Owing to the change in the current crankcase pressure, the setpoint pressure value is also changed according to the invention and adapted to the change in the current crankcase pressure. Owing to the weighting of the deviation of the current crankcase pressure, in particular the filtered current crankcase pressure, by the factor by means of the multiplier 100 (FIG. 3), the changing in the setpoint pressure value takes place, however, significantly more slowly and significantly less steeply. At a time t2, the curve 116 intersects the curve 112. A fault is therefore detected which can entail suitable measures for avoiding damage to the diesel engine 10. The profiles of the curves 110, 112 and 116 which are illustrated after the time t2 in FIG. 4 are possible profiles which occur if no suitable measures are to be carried out after the detection of the fault.

The invention claimed is:

1. A method for monitoring a crankcase pressure in a crankcase housing of an internal combustion engine, comprising the steps of:
    establishing predetermined desired pressure values for the crankcase pressure for a plurality of operating points of the internal combustion engine;
    monitoring actual crankcase pressure;
    changing at least one of the predetermined desired pressure values during operation of the internal combustion engine, including changing the at least one of the predetermined desired pressure values as a function of detection of steady-state operation of the internal combustion engine, during which the internal combustion engine is operated within limits of an operating range of the internal combustion engine over at least one predefined time period; and
    shutting off the internal combustion engine when the crankcase pressure is outside of the predetermined desired pressure values.

2. The method according to claim 1, wherein a hysteresis range for the detection of the steady-state operation of the internal combustion engine is present at a limit of the operating range.

3. The method according to claim 1, including detecting faults during the operation of the internal combustion engine as a function of pressure information about a current crankcase pressure and a sum of a predefined offset value and the predetermined desired pressure value for the crankcase pressure that is assigned to a predefined operating point of an operating range in which the internal combustion engine is operated, and shutting off the internal combustion engine when a fault is detected.

4. The method according to claim 1, including determining a deviation of the at least one of the predetermined desired pressure values from pressure information about a current crankcase pressure and changing the at least one of the predetermined desired pressure values as a function of a multiplication of the deviation by a factor, wherein the factor is less than one and greater than zero.

5. The method according to claim 1, including changing the at least one of the predetermined desired pressure values as a function of pressure information about a currently present crankcase pressure.

6. The method according to claim 5, including filtering the pressure information by a filter, and changing the at least one of the predetermined desired pressure values as a function of the filtered pressure information.

7. The method according to claim 6, wherein the filter provides averaging over time that is characterized by a filter time constant as a filter parameter.

8. The method according to claim 7, including changing the at least one of the predetermined desired pressure values as a function of detection of steady-state operation of the internal combustion engine, during which the internal combustion engine is operated within limits of an operating range of the internal combustion engine over at least one predefined time period, wherein the filter time constant is shorter than the predefined time period for the detection of the steady-state operation of the internal combustion engine.

9. A control apparatus for monitoring a crankcase pressure in a crankcase housing of an internal combustion engine, wherein the control apparatus comprises: a steady-state detector that detects steady state operation of the internal combustion engine; and a comparator to compare crankcase pressure, the control apparatus being configured to establish predetermined desired pressure values for the crankcase pressure for a plurality of operating points of the internal combustion engine, the predetermined desired pressure values being stored in the memory, and change at least one of the predetermined desired pressure values during operation of the internal combustion engine, wherein the change includes changing the at least one of the predetermined desired pressure values as a function of detection of steady-state operation of the internal combustion engine, during which the internal combustion engine is operated within limits of an operating range of the internal combustion engine over at least one predefined time period.

\* \* \* \* \*